United States Patent [19]

Handke

[11] Patent Number: 4,731,531

[45] Date of Patent: Mar. 15, 1988

[54] METHOD OF LOGGING A WELL USING A NON-RADIOACTIVE MATERIAL IRRADIATED INTO AN ISOTOPE EXHIBITING A DETECTABLE CHARACTERISTIC

[75] Inventor: Wayne A. Handke, Duncan, Okla.

[73] Assignee: Halliburton Company, Duncan, Okla.

[21] Appl. No.: 823,891

[22] Filed: Jan. 29, 1986

[51] Int. Cl.[4] .............................................. G01V 5/00
[52] U.S. Cl. ..................................... 250/259; 250/260
[58] Field of Search ....................... 250/256, 259, 260; 376/167

[56] References Cited

U.S. PATENT DOCUMENTS

| | | | |
|---|---|---|---|
| 2,951,535 | 9/1960 | Mihram et al. | 166/42 |
| 2,968,721 | 1/1961 | Shapiro et al. | 250/43.5 |
| 3,002,091 | 9/1961 | Armstrong | 250/83 |
| 3,004,161 | 10/1961 | Rickard | 376/167 |
| 3,019,341 | 1/1962 | Monaghan | 250/260 |
| 3,129,331 | 4/1964 | Bourne, Jr. et al. | 250/83.3 |
| 4,071,756 | 1/1978 | Casad | G01 V/5/00 |
| 4,076,980 | 2/1978 | Arnold et al. | 250/260 |
| 4,199,680 | 4/1980 | Moon | G01 V/5/00 |
| 4,493,999 | 1/1985 | Catchen | G01 V/5/00 |

OTHER PUBLICATIONS

Chapter 7, *The Technical Applications of Radioactivity*, vol. 1, by Broda and Schonfeld (Pergamon Press 1966). Halliburton Services Fracturing Technical Data on Rayfrac ® propping agent. SPE 9067, "Evolution of Fracturing in the Oak Hill Field"

*Primary Examiner*—Janice A. Howell
*Attorney, Agent, or Firm*—James R. Duzan; E. Harrison Gilbert, III

[57] ABSTRACT

A method of logging a well includes the steps of moving a tagging agent into a well so that the tagging agent is deposited in an earthen formation of the well, which tagging agent is non-radioactive at least until just prior to entering the well; irradiating the tagging agent so that the tagging agent exhibits at least one tagging agent characteristic distinguishable from earthen formation characteristics, and detecting the at least one tagging agent characteristic after the tagging agent has been deposited in the earthen formation.

10 Claims, 2 Drawing Figures

METHOD OF LOGGING A WELL USING A NON-RADIOACTIVE MATERIAL IRRADIATED INTO AN ISOTOPE EXHIBITING A DETECTABLE CHARACTERISTIC

BACKGROUND OF THE INVENTION

This invention relates generally to methods of logging a well and more particularly, but not by way of limitation, to methods of detecting a fracture of an earthen formation having a proppant deposited in the fracture, which proppant at least initially includes a non-radioactive substance which is irradiated after the proppant has been safely placed into a flow system of an oil or gas well traversing the earthen formation.

During the development and operation of oil or gas wells, various types of logs are sometimes obtained for providing information about the conditions or geological structures of the downhole environment of the well. Pressure, temperature, resistivity, porosity, fracture locations, fracture types, fracture numbers, fracture thicknesses and fracturing method effectiveness are examples of information sought to be obtained from various logging techniques. These techniques have included mechanical, electrical and radiological methods. It is the radiological methods to which the present invention relates.

In performing radiological logging methods, different nuclear or atomic reactions or characteristics are detected. For example, in a known neutron-neutron logging operation, the relative neutron absorbabilities of different materials found in an earthen formation traversed by the well are used to show the distinctions between such materials and their relative locations in the formation. In neutron-gamma logging, gamma radiation is detected to show the distinctions. During such logging operations the detected characteristics are induced by an external source of neutrons that bombards naturally occurring materials. One shortcoming of these techniques is their lack of sensitivity or ability to clearly distinguish among the various radioactivities or absorbabilities of the various types of substances naturally found in the formation, which substances are not known to the personnel conducting the tests without first conducting some other type of test (for example, the taking of a core sample). Such other test would slow down the radiological logging techniques and thereby defeat one of their benefits, which is their ability to be relatively quickly performed.

Another radiological method includes injecting into the earthen formation a known radioactive substance, such as a radioactive isotope-coated propping agent, which can be readily traced as to its location within the formation. This method has been implemented with both radioactive isotope-coated particulate proppant and with radioactive liquids or solutions. A significant shortcoming of this method is the risk of exposure or contamination of personnel, equipment and the environment at the surface of the well where such radioactive substances must be handled by personnel under whatever weather conditions exist at the time. This risk of exposure or contamination also exists with respect to the well bore equipment through which the radioactive substance must flow and with respect to the formations into which the radioactive substance may uncontrollably flow. Additionally, if the radioactive proppant flows back up the well, there is the risk of a possibly uncontrollable exposure or contamination at the surface. Another disadvantage of this prior method is that because all of the injected substance is radioactive at the time it is injected, the entire injected quantity continues to radioactively decay so that additional logs cannot be run at some indeterminate time in the future after which the injected material has sufficiently decayed to preclude accurate detection. Therefore, additional injections of the radioactive substances must be performed to conduct additional logs after such time, which additional injections create further risks of exposure and contamination.

A more indirect radiological method for determining features of the downhole earthen formation, and one from which no direct downhole log is obtained, is disclosed in U.S. Pat. No. 3,002,091 to Armstrong. The Armstrong method pertains to a non-radioactive material which is flowed into one well, through a formation and out another well, at which point of production from the second well the material is irradiated at the surface to determine how much of the material made it through the formation, thereby giving some indication of the nature of the formation. A shortcoming of this technique is that it produces a radioactive substance at the surface of the second well, which radioactive substance needs to be carefully handled and disposed of to prevent exposure and contamination. Thus, this initially non-radioactive method still poses exposure and contamination risks by being subsequently made radioactive at the surface after it has flowed through the formation. Additionally, this technique does not identify specific locations of features of the earthen formation.

Despite the variety of radiological methods currently known, there is still the need for an improved method which overcomes the shortcomings of these various prior methods. Such an improved method should inject into the well an external substance which has a known nuclear or atomic reaction or characteristic which is readily distinguishable from any such reactions or characteristics of the naturally occurring substances in the formation, but which can be safely handled at the surface to overcome the significant risks posed by those prior art methods wherein radioactive substances must either be handled in putting them into the system or in extracting them from the system. Such an improved method should also produce a log directly indicating specific information as to the location of features in the formation, and such a method should allow multiple logs to be obtained over an indeterminate period of time using the original quantity of the external substance initially injected. Such a method should also be capable of being performed with known types of radiological equipment, such as that used in heretofore known neutron-neutron logging and neutron-gamma logging operations. Such a method should also be controllable as to where the external substance is to be injected and as to how much of the deposited quantity has been used to create the detectable nuclear or atomic reactions or characteristics.

SUMMARY OF THE INVENTION

The present invention overcomes the above-noted and other shortcomings of the prior art by providing a novel and improved method of logging a well. The present invention utilizes an external material having a known nuclear or atomic reaction or characteristic by which it can be distinguished from other substances found in the earthen formation of the well into which the material is to be injected. The external material (which can be in any suitable form, such as particulate, liquid or foam) is initially non-radioactive so that it can be easily and safely maintained and handled at the surface of the well without concern for radioactive exposure or contamination at least until after it has been put into the injection system (in one embodiment, the substance is made radioactive just prior to entering the well, but after being loaded into the injection system; in another, the substance is made radioactive after it has been deposited in the formation; in a further embodiment, the substance is converted from one non-radioactive isotope to another non-radioactive isotope—the last two-mentioned embodiments provide an additional safety feature in that any flow-back of the substance out of the well is not radioactive as to the second-mentioned embodiment unless the flowback occurs after the substance becomes radioactive and is not radioactive as to the third-mentioned embodiment because it does not produce a radioactive substance). The method of the present invention is readily controllable as to where the material is to be deposited and as to how much is to be radiologically activated, and the method can be implemented to produce several logs over time using only a single injection of the initially non-radioactive material. The present invention can be implemented with known equipment, such as of the type previously used in neutron-neutron logging and neutron-gamma logging operations. Through use of the present invention, specific information about the location of features in the earthen formation can be directly obtained.

Broadly, the method of logging a well in accordance with the present invention comprises moving a tagging agent into a well so that the tagging agent is deposited in an earthen formation of the well, the tagging agent being non-radioactive at least until just prior to entering the well; irradiating the tagging agent so that the tagging agent exhibits at least one tagging agent characteristic distinguishable from earthen formation characteristics; and detecting the at least one tagging agent characteristic after the tagging agent has been deposited in the earthen formation.

In a specific use of the present invention, a fracture in an earthen formation is detected. A specific adaptation of the method applied to this use comprises depositing a quantity of a neutron-responsive non-radioactive isotope in the fracture in the earthen formation; lowering into the well a source of neutrons; creating with the source of neutrons atomic reactions in both the earthen formation and the deposited isotope; and detecting the difference between the atomic reactions of the earthen formation to the neutrons and the atomic reactions of the isotope to the neutrons so that at least one feature of the fracture in which the isotope is deposited is determined.

Another specific adaptation of the method to this use of detecting a fracture in an earthen formation comprises locating a source of neutrons near the mouth of the well; moving into the source of neutrons a neutron-responsive non-radioactive isotope; converting, within the source of neutrons, the neutron-responsive non-radiactive isotope into a radioactive isotope; moving the radioactive isotope from the source of neutrons into the well for depositing in the fracture; and detecting the radioactivity emitted from the radioactive isotope deposited in the fracture.

Therefore, from the foregoing, it is a general object of the present invention to provide a novel and improved method of logging a well. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Generally, the method of the present invention comprises the steps of moving into a well a tagging agent, which is non-radioactive at least until just prior to entering the well, so that the tagging agent will be deposited in an earthen formation of the well; irradiating the tagging agent so that the tagging agent exhibits at least one tagging agent characteristic distinguishable from earthen formation characteristics; and detecting the at least one tagging agent characteristic after the tagging agent has been deposited in the earthen formation. As used herein, the phrase "just prior to entering the well" means a location from which further movement of the material is in a substantially closed system which ultimately communicates with the well bore so that there is little risk of the material, should it then be radioactive, exposing or contaminating anything outside the system. As the tagging agent is so defined, however, it need never become radioactive so that it then remains radiologically safe wherever it is. As used herein, "irradiating" is given a broad definition of by some means exposing to radiation, particularly nuclear or atomic radiation, including but not necessarily limited to gamma radiation or to the emission of alpha or beta particles or of nucleons.

The foregoing general steps of the method of the present invention will be more particularly described with reference to the preferred embodiments depicted in FIGS. 1 and 2.

Figure 1:
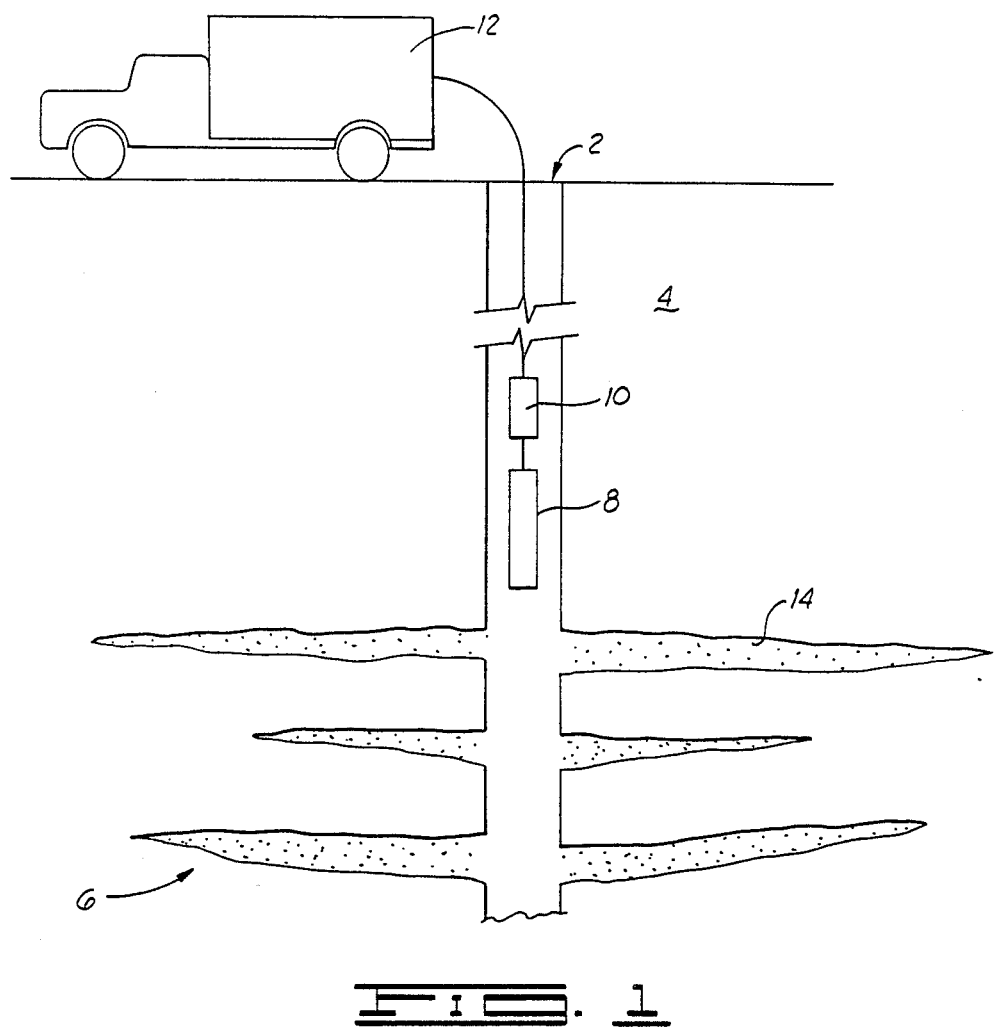
FIG. 1 is a diagram applicable to either of two embodiments of the method of the present invention.

With reference to FIG. 1, a well 2 is shown bored into the earth 4 so that the well traverses or intersects one or more earthen formations which may include one or more different geological strata. Although it is not to be taken as limiting the scope of the present invention, reference will be made to one earthen formation in which one or more fractures 6 have been formed prior to, or are formed concurrently with, the step of moving the tagging agent into the well. That is, the preferred embodiments as described with reference to FIG. 1 (as well as the embodiment subsequently described with reference to FIG. 2) can be implemented concurrently with a fracturing operation, whereby the tagging agent is mixed with the fracturing fluid, or it can be implemented after the fracturing operation has occurred. The present invention is, however, not limited to such specific applications.

FIG. 1 also shows a radiation source 8 and a detector 10 concurrently lowered into the well 2 from a logging truck 12. These representations only schematically depict the actual devices as their associated hoisting and recording equipment located at the surface of the well 2 are well known. For example, in the preferred embodiment the source 8 is a downhole accelerator of a type as known to the art for emitting a flux of neutrons to bombard the formation and the deposited tagging agent. The detector 10 is, by way of example, a Geiger counter or a scintillation detector of known types for detecting gamma radiation or a suitable detector for detecting thermal neutrons, depending upon which reaction or characteristic (i.e., gamma radiation or thermal neutrons) is to be detected, as more particularly described hereinbelow.

FIG. 1 still further shows a tagging agent 14 which in general is a radiation-responsive substance and which in this FIG. 1 embodiment specifically includes a particulate proppant made of a suitable material that readily mixes or interfaces, in a non-reactive or otherwise non-deleterious manner, with the carrier fluid, such as the fracturing fluid, carrying the tagging agent into the well 2. A suitable particulate proppant is the type used in Rayfrac ® propping agents or as disclosed in U.S. Pat. No. 4,199,680 to Moon. One specific type of suitable substance includes appropriately sized grains of mold sand. It is to be noted, however, that in general the tagging agent can be in a suitable form other than particulate (e.g., liquid or foam, or otherwise).

In the FIG. 1 embodiment the proppant is coated with an infusable resin containing a suitable quantity of a neutron-responsive non-radioactive substance, such as the non-radioactive isotopes of iridium 191, iridium 193, or cadmium 113. Non-radioactive isotopes of boron and indium may also be suitable. The substance which is to be included in the preferred embodiment proppant, whether by coating or other suitable association with the carrier element of the proppant, is neutron-responsive so that it readily reacts to neutrons, such as by absorbing thermal neutrons to exhibit a relatively large atomic cross section. By such responsiveness to neutrons, the substance yields the characteristic (e.g., gamma radiation or neutron absorption) which is distinguishable from the characteristics of the materials in the surrounding formation. This substance is also at least initially non-radioactive so that it can be safely handled without fear or risk of radiation exposure or contamination at the surface of the well until it is introduced into the system by which it is to be moved into the well. Although the proppant is initially non-radioactive, the isotope of the proppant is one which either becomes radioactive, whereby the created radioactive isotope decays and emits gamma radiation detectable by a suitable embodiment of the detector 10, or otherwise undergoes a nuclear or atomic reaction, such as by simply absorbing one or more neutrons to an extent greater than the materials of the surrounding formation. Such a reaction occurs in response to the external neutrons emitted from the accelerator 8. If the original substance is to react by forming a radioactive isotope, the radioactive isotope preferably has a known half-life of between approximately a few seconds and approximately 100 days so that prolonged irradiation by the accelerator 8 is not needed for the reaction to occur and so that adequate detection time exists once the conversion has occurred.

For the arrangement shown in FIG. 1, the general step of moving the tagging agent into the well particularly includes depositing a suitable quantity of the neutron-responsive non-radioactive isotope in the fracture in the earthen formation. Such depositing occurs by controlling the carrier substance, such as the fracturing fluid, in creating the fracture or by otherwise conveying the proppant (or other suitable form of the tagging agent) into the fracture. Such depositing can be implemented using known injection equipment of the type used with the aforementioned fracturing fluids. This equipment flows the proppant into the well and builds up relatively large deposits of the proppant in the fractures, as illustrated in FIG. 1 by the proppant 14 located in the fractures 6.

With reference to a tagging agent which is activated into a radioactive isotope which emits gamma radiation, such as iridium 191 or iridium 193, the general step of irradiating the tagging agent includes lowering the source 8, such as the aforementioned neutron-source accelerator, into the well 2. In general, this step of lowering is performed after the tagging agent has been deposited; however, this is not a necessary limitation. The step of irradiating also includes creating with the source 8 atomic reactions in both the earthen formation and the isotope associated with the deposited proppant. These atomic reactions are created by activating the source 8 so that neutrons are emitted into the earthen formation to then activate the tagging agent, whereupon the activated tagging agent exhibits the at least one tagging agent characteristic which is distinguishable from the earthen formation characteristics (i.e., the emission of gamma radiation in this embodiment).

In a specific implementation, a suitable downhole accelerator is activated so that the formation and the deposited proppant are exposed to the desired flux of neutrons. The flux of neutrons initially produced by the accelerator comprises a large flux of fast neutrons which ultimately slow down and become thermal neutrons that are absorbed by, or otherwise affect, the non-radioactive isotope associated with the proppant, which isotope thereby is converted into the radioactive isotope. This flux is controlled so that at least a portion of the quantity of the neutron-responsive non-radioactive isotope is converted into the radioactive isotope emitting gamma radiation which is distinguishable from gamma radiation emitted by the earthen formation in response to the bombardment of neutrons from the accelerator.

In this embodiment the step of detecting the characteristic includes detecting the difference between the atomic reactions of the earthen formation to the neutrons and the atomic reactions of the isotope to the neutrons so that at least one feature of the fracture in which the isotope is deposited is determined. Specifically, the detector 10, in the embodiment of a gamma radiation detector, is lowered into the well for detecting gamma radiation emitted from the tagging agent after the tagging agent has been deposited in the earthen formation and after it has been irradiated. As indicated in FIG. 1, the lowering of the detector can be concurrent with lowering of the radiation source 8. Thus, in this configuration, the source 8 is activated for a desired time at one or more locations, and the detector 10 follows to monitor the resultant gamma radiation. By repeating the steps of irradiating and detecting, a multiple-depth or continuous log can be created throughout a selected length of the well.

When the proppant 14 includes cadmium 113, or other suitable material which is particularly good at absorbing neutrons to an extent greater than the substances likely to be naturally occurring in the earthen formation, the steps are similar to those just described except that the step of creating the atomic reactions includes converting at least a portion of the quantity of the neutron-responsive non-radioactive isotope into a quantity of an isotope having one or more additional nucleons (i.e., neutrons or protons) therein so that neutrons from the source of neutrons are relatively more absorbed in the isotope deposited in the fracture than in the earthen formation. Stated another way, the parent material isotope is transformed into a daughter material isotope with a greater atomic weight. With respect to cadmium 113, at least, this conversion changes the non-radioactive cadmium 113 isotope into another non-radioactive isotope, cadmium 114; therefore, with this specific material even the converted tagging agent is non-radioactive, which is a significant advantage of this embodiment. Another exception of the neutron-absorbing embodiment over the gamma-radiation embodiment is that the step of detecting the tagging agent characteristic includes lowering into the well a suitable embodiment of the detector 10 by which the relative difference between the absorption of the neutrons by the earthen formation and the absorption of the neutrons by the tagging agent is detected.

The foregoing embodiments described with reference to FIG. 1 are particularly suited for producing multiple logs over an indeterminate period of time (which may even extend well beyond the half-life of the radioactive isotope into which the original proppant isotope is converted in the one embodiment) without having to reinject any additional material. For this specific adaptation of making multiple logs, the steps are similar to those already described except that attention is given to how much of the original deposited quantity is converted during each logging operation. Generally, the irradiating step of creating atomic reactions includes converting a first portion of the quantity of the neutron-responsive non-radioactive isotope into a quantity of an isotope which gives within the fracture the at least one characteristic that is distinguishable from the characteristics of the earthen formation. Additionally, the overall method further comprises converting, at a time after an earlier performance of the step of detecting the difference between the atomic reactions created by the step of converting the aforementioned first portion, a second portion of the quantity of the neutron-responsive non-radioactive isotope into a separate quantity of an isotope which gives at least one characteristic distinguishable from characteristics of the earthen formation. Following this step, the difference between the at least one characteristic given the separate quantity of isotope and the characteristics of the earthen formation is detected.

One of two techniques is used in the preferred embodiment to control the irradiating of the tagging agent so that a sufficient quantity of the original non-radioactive isotope remains after the initial logging to provide a deposit which can be subsequently irradiated and detected. In one of the techniques, the step of converting a first portion of the quantity of the non-radioactive isotope includes exposing the originally deposited quantity of the non-radioactive isotope to the source of neutrons and controlling the length of time of the exposure to define the size of the first portion. In the other technique, the size of the converted first portion is controlled or defined by having the step of converting a first portion of the quantity of the non-radioactive isotope include the step of exposing the quantity of the non-radioactive isotope to the source of neutrons for a predetermined time period and by having the step of depositing the original quantity include the step of flowing into the well, as the quantity of the neutron-responsive non-radioactive isotope to be deposited in the fracture, an amount dependent upon the predetermined time period to which the quantity will be exposed to the source of neutrons.

The aforementioned exposure-time and deposited-quantity controls for defining the portion of the original quantity of non-radioactive isotope converted into another isotope are illustrated by the following example wherein it is assumed that a proppant including ten (10) grams of the iridium 191 isotope, in the form of iridic potassium chloride ($K_2IrCl_6$), has been deposited in the well 2, wherein the temperature is 100° C., for conversion into the radioactive isotope, iridium 192, which emits detectable gamma radiation. Various activities, A, proportional to the converted positions of the deposited quantity will be determined for various activation times of the source 8 (embodied as a neutron accelerator which emits a neutron flux of $\phi = 1.5 \times 10^8$ neutrons/cm$^2$-sec), thereby indicating the need to control either the exposure time or the deposited quantity.

From equations known to the art, $$A = (2.7 \times 10^{-5}) (\phi) (\sigma_a) (N_o) (1 - e^{-\lambda t}) \text{ microcuries,}$$

where $\phi$ is the flux of thermal neutrons to which the parent material (i.e., the original non-radioactive substance) is subjected; $\sigma_a$ is the neutron capture cross section in centimeters$^2$ for thermal neutrons of the parent material (which equals the product of ($\sigma_{a \, at \, 293° \, K.}$) ($\sqrt{\pi}/2$) ($\sqrt{293/T}$), where T is in degrees Kelvin); $N_o$ is the amount of parent nuclei; $\lambda$ is the decay constant in seconds$^{-1}$ of the newly formed material (which equals $0.693/t_{\frac{1}{2}}$, where $t_{\frac{1}{2}}$ = the radioactive half-life in seconds); and t is the period of time during which the parent material is subjected to the neutron flux from the source 8.

Because for any selected isotope and neutron source as used in the present invention, the values of $\sigma_a$, $\lambda$ and $\phi$ will be known, the principal variables by which the activity A can be changed are the original quantity of the parent material, $N_o$, and the time of irradiation, t. Furthermore, because A is proportional to the portion of the parent material that has been converted into the converted isotope (a quantity N), the ability to make subsequent logs using unreacted portions of the original deposit of the propping agent is affected by controlling either the original quantity, $N_o$, or the activation time, t, or both. That is, varying the original quantity, $N_o$, or the activation time, t, will produce different amounts of activated material downhole.

Continuing with the example, the weight percent of the iridium 191 isotope in the ten grams of iridic potassium chloride is 39.78%. Thus, there are 3.978 grams of the iridium 191 isotope in the tagging agent, which translates into $N_o = 1.247 \times 10^{22}$ nuclei. The known neutron cross section of iridium 191 is 750$b$ at 293° K., thus $\sigma_a$ at the 100° (373° K.) temperature of the well is $5.89 \times 10^{-22}$ cm$^2$.

For the iridium 192 radioisotope produced from the irradiated iridium 191 isotope, the half-life, $t_{\frac{1}{2}}$, is 74.4 days; therefore, $\lambda = 1.078 \times 10^{-7}$ sec$^{-1}$.

The resultant activities of the iridium 192 isotope created downhole from the neutron source for activation times, t, of one second, one minute, one hour and one day are $A_{1 sec} = 3.20 \times 10^{-3}$ microcuries, $A_{1 min} = 1.92 \times 10^{-1}$ microcuries, $A_{1 hr} = 11.54$ microcuries, and $A_{1 day} = 275.76$ microcuries. These activity values clearly exemplify that as the activation time, t, increases, so does the activity, thereby indicating the conversion of more of the original deposit. This holds true because the term $(1-e^{-\lambda t})$ of the initial equation increases as t increases. It should be noted, however, that $(1-e^{-\lambda t})$ approaches a value of one as t increases to infinity. At a value of $t=4t_{\frac{1}{2}}$, the $(1-e^{-\lambda t})$ term is at a value of approximately 0.94.

From the foregoing, it has been concluded that the activation time, t, of the neutron source 8 should be limited to a value of less than 4 times the half-life of the isotope to be created by the neutron flux because for activation times greater than this, there is a rapid decrease in activation per unit time of activation. For values of the activation time which are less than $t_{\frac{1}{2}}$, the activation per unit of time of activation is approximately constant.

Figure 2:
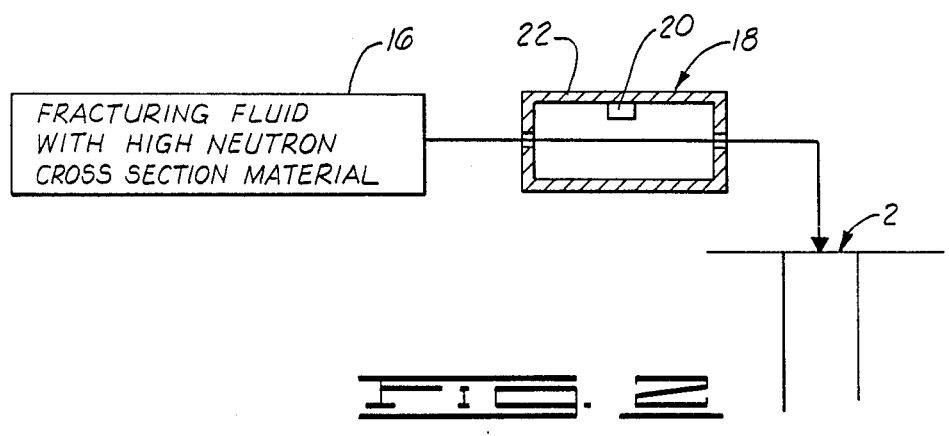
FIG. 2 is a diagram depicting an implementation of another embodiment of the method of the present invention.

The foregoing considerations pertaining to converted quantities and multiple logs are addressed primarily to the FIG. 1 embodiment because the FIG. 2 embodiment is directed to an embodiment of the present invention wherein the initially non-radioactive tagging agent is irradiated at the surface of the well after it has been safely put into the injection system, but prior to it flowing into the well. Thus, with this embodiment of FIG. 2, the safety benefits of the present invention are still obtained, but the subsequent use of the surface-irradiated material is substantially the same as in those methods such as of the type used in the Rayfrac ® propping agent. Therefore, since irradiation is at the surface for the FIG. 2 embodiment, this embodiment is not necessarily concerned with additional activation for taking subsequent logs; however, because the non-radioactive tagging agent is still used in this other embodiment, the surface irradiation can be controlled so that not all of the agent is activated whereby there could exist unactivated deposits of the non-radioactive isotope, which deposits could be subsequently activated using one of the embodiments represented in FIG. 1.

Another distinction of the FIG. 2 embodiment from that shown in FIG. 1 is that the FIG. 2 embodiment is directed to use with materials, such as the iridium 191 and the iridium 193 isotopes, that, upon irradiation, become radioactive with gamma ray emissions. That is, what is to be detected in the FIG. 2 embodiment is gamma radiation since no source 8 is being used downhole. However, the scope of the invention does not preclude modification of the basic FIG. 2 embodiment to use both a source 8 and a suitable detector downhole.

Briefly, FIG. 2 depicts a source of tagging agent 16, particularly shown as a mixture of the tagging agent (in an appropriate form) with a suitable fracturing fluid, providing a flow of the tagging agent into a radiation source 18, such as a suitable neutron accelerator 20 housed in a protective shield 22 located near the mouth of the well 2 (or otherwise downstream of other surface equipment whereby surface equipment exposure and contamination are minimized). As the non-radioactive isotope-containing tagging agent passes inside the source 18, the non-radioactive isotope is converted into a radioisotope. Such activated tagging agent moves from the source 18 into the well 2 for depositing in the fractures. A suitable detector of the gamma radiation detecting type is lowered into the well for detecting the radioactivity emitted from the activated tagging agent.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts and the performance of steps can be made by those skilled in the art, which changes are encompassed within the spirit of this invention as defined by the appended claims.

What is claimed is:

1. A method of logging a well, comprising:
    moving a tagging agent into a well so that the tagging agent is deposited in an earthen formation of the well, the tagging agent being non-radioactive until just prior to entering the well;
    irradiating the tagging agent so that the tagging agent exhibits at least one tagging agent characteristic distinguishable from earthen formation characteristics, wherein irradiating the tagging agent includes passing the tagging agent through a source of neutrons before the tagging agent is moved into the well; and
    detecting the at least one tagging agent characteristic after the tagging agent has been deposited in the earthen formation.

2. A method of logging a well, comprising:
    moving a tagging agent into a well so that the tagging agent is deposited in an earthen formation of the well, the tagging agent being non-radioactive at least until just prior to entering the well;
    irradiating the tagging agent so that the tagging agent exhibits at least one tagging agent characteristic distinguishable from earthen formation characteristics, wherein irradiating the tagging agent includes converting the tagging agent into a radioactive isotope having a known half-life, wherein converting the tagging agent includes emitting neutrons at the tagging agent for a period of time-less than approximately four times the known half-life of the radioactive isotope into which the tagging agent is converted; and
    detecting the at least one tagging agent characteristic after the tagging agent has been deposited in the earthen formation.

3. A method of detecting a fracture in an earthen formation of a well, comprising: depositing a quantity of a neutron-responsive non-radiactive isotope in the fracture in the earthen formation;
    lowering into the well a source of neutrons;
    creating with the source of neutrons atomic reactions in both the earthen formation and the deposited isotope, wherein creating atomic reactions includes converting a first portion of the quantity of the neutron-responsive non-radioactive isotope into a quantity of an isotope which gives within the fracture at least one characteristic distinguishable from characteristics of the earthen formation;
    detecting the difference between the atomic reactions of the earthen formation to the neutrons and the atomic reactions of the isotope to the neutrons so that at least one feature of the fracture in which the isotope is deposited is determined;
    converting, at a time after the step of detecting the difference between the atomic reactions, a second portion of the quantity of the neutron-responsive non-radioactive isotope into a separate quantity of an isotope which gives at least one characteristic distinguishable from characteristics of the earthen formation; and
    detecting the difference between the at least one characteristic given by the separate quantity of isotope and the characteristics of the earthen formation.

4. A method as defined in claim 3, wherein the step of converting a first portion of the quantity of the neutron-responsive non-radioactive isotope includes:
   exposing the quantity of the neutron-responsive non-radioactive isotope to the source of neutrons; and
   controlling the length of time for exposing the quantity of the neutron-responsive non-radioactive isotope to the source of neutrons to define how much of the total quantity of the neutron-responsive non-radioactive isotope is converted into the first portion quantity of an isotope which gives within the fracture at least one characteristic distinguishable from characteristics of the earthen formation.

5. A method as defined in claim 4, wherein:
   the step of converting a first portion of the quantity of the neutron-responsive non-radioactive isotope includes exposing the quantity of the neutron-responsive non-radioactive isotope to the source of neutrons for a predetermined time period; and
   the step of depositing includes flowing into the well, as the quantity of the neutron-responsive non-radioactive isotope to be deposited in the fracture, an amount dependent upon the predetermined time period to which the quantity will be exposed to the source of neutrons so that how much of the neutron-responsive non-radioactive isotope is converted into the first portion quantity of an isotope which gives within the fracture at least one characteristic distinguishable from characteristics of the earthen formation is thereby controlled.

6. method of detecting a fracture in an earthen formation of a well, comprising:
   locating a source of neutrons near the mouth of the well but outside of the well;
   moving into the source of neutrons a neutron-responsive non-radioactive isotope;
   converting, within the source of neutrons located near the mouth of the well but outside of the well, the neutron-responsive non-radioactive isotope into a radioactive isotope;
   moving the radioactive isotope from the source of neutrons through the mouth of the well and into the well for depositing in the fracture; and
   detecting the radioactivity emitted from the radioactive isotope deposited in the fracture.

7. A method as defined in claim 6, wherein the step of moving into the source of neutrons a neutron-responsive non-radioactive isotope includes flowing a particulate proppant having an external coating including an isotope selected from the group consisting of iridium 191 and iridium 193.

8. A method of logging a well, comprising:
   (a) connecting a source of neutrons, located outside the well, to the mouth of the well through a closed system extending between the source of neutrons and the mouth of the well;
   (b) moving into the source of neutrons a neutron-responsive non-radioactive isotope;
   (c) within the source of neutrons, converting into a radioactive isotope a first portion of the neutron-responsive non-radioactive isotope moved into the source of neutrons so that a second portion of the neutron-responsive non-radioactive isotope remains as neutron-responsive non-radioactive isotope, which radioactive isotope has a known half-life;
   (d) moving the first portion radioactive isotope and the second portion neutron-responsive non-radioactive isotope from the source of neutrons, through the closed system and mouth of the well, and into the well; and
   (e) detecting the radioactivity emitted from the first portion radioactive isotope in the well.

9. A method as defined in claim 8, further comprising:
   (f) lowering into the well a source of neutrons;
   (g) irradiating with the source of neutrons lowered into the well at least part of the second portion neutron-responsive non-radioactive isotope in the well so that the irradiated part exhibits at least one characteristic distinguishable from earthen formation characteristics; and
   (h) detecting the at least one characteristic.

10. A method as defined in claim 9, further comprising performing steps (f), (g) and (h) a period of time after performing step (e), which period of time is longer than the known half-life of the radioactive isotope converted during step (c).

* * * * *